Aubrey I. Copelan
INVENTOR

BY
ATTORNEYS

# United States Patent Office 3,525,414
Patented Aug. 25, 1970

3,525,414
PROTECTIVE AUTOMOTIVE IGNITION CIRCUIT
Aubrey I. Copelan, Los Angeles, Calif. (401 W. Manchester Blvd., Inglewood, Calif. 90301)
Continuation-in-part of application Ser. No. 659,748, Aug. 10, 1967. This application Mar. 18, 1968, Ser. No. 713,791
Int. Cl. B60r 25/00
U.S. Cl. 180—114                3 Claims

ABSTRACT OF THE DISCLOSURE

A protective circuit to prevent unauthorized starting of the engine in an automotive vehicle or the unauthorized opening of the hood or trunk lid. The energizing circuits for the engine ignition system and the starting relay are interrupted by a relay component requiring actuation of a hidden switch after the ignition key is turned to the ignition position in order to start the engine by turning the key to the start position. The distributor is also grounded by a wire through the relay component and any time the ignition coil is deenergized by turning the ignition key to the off position, starting of the engine is prevented. Solenoids are also coupled to the hidden switch to lock the hood and trunk lid closed until the switch is actuated, and an external jack is provided to permit the hood or trunk to be opened in the event of battery failure.

---

This is a continuation-in-part of my application filed Aug. 10, 1967, Ser. No. 659,748, and since abandoned.

This invention relates to an improvement in the ignition starting system of an automotive vehicle, the purpose of which is to discourage theft of the vehicle by preventing unauthorized starting of the vehicle.

Various proposals have been made for modifying the ignition starting system of vehicle engines for the purpose of discouraging theft. Many of the proposals involve expensive modifications and installation of lock devices capable of being bypassed. The provision of a foolproof system which involves little modification of the ordinary vehicle equipment would therefore be more readily acceptable.

In accordance with the present invention, a theft discouraging circuit has been devised which requires the mounting of a hidden switch and relay component together with some rewiring of the ignition starting system. The concealed switch must accordingly be actuated after the ignition key is turned to the ignition position in order to effect authorized starting of the vehicle engine. Each time the ignition switch is turned to the off position, the concealed switch must be actuated once again to start the vehicle engine. Also, deenergization of the ignition coil by unauthorized tampering with the ignition system will prevent starting of the vehicle engine. The foregoing objects are achieved by means of a relay component to which the hidden switch is wired and through which energizing circuits are completed for both the starter relay and the ignition system.

The circuit also affords means for preventing theft from under the hood or from within the trunk. Solenoid locks are coupled through the hidden switch to the ignition system and it shall require the actuating of both the ignition switch and the hidden switch to open either one. Since a battery failure would make the solenoids inoperable and therefor a great inconvenience, an external jack is provided for connection to an auxiliary battery.

These together with other objects and advantages which will become subsequently apparent reside in the details of construction and operation as more fully hereinafter described and claimed, reference being had to the accompanying drawings forming a part hereof, wherein like numerals refer to the like parts throughout, and in which:

Figure 1:
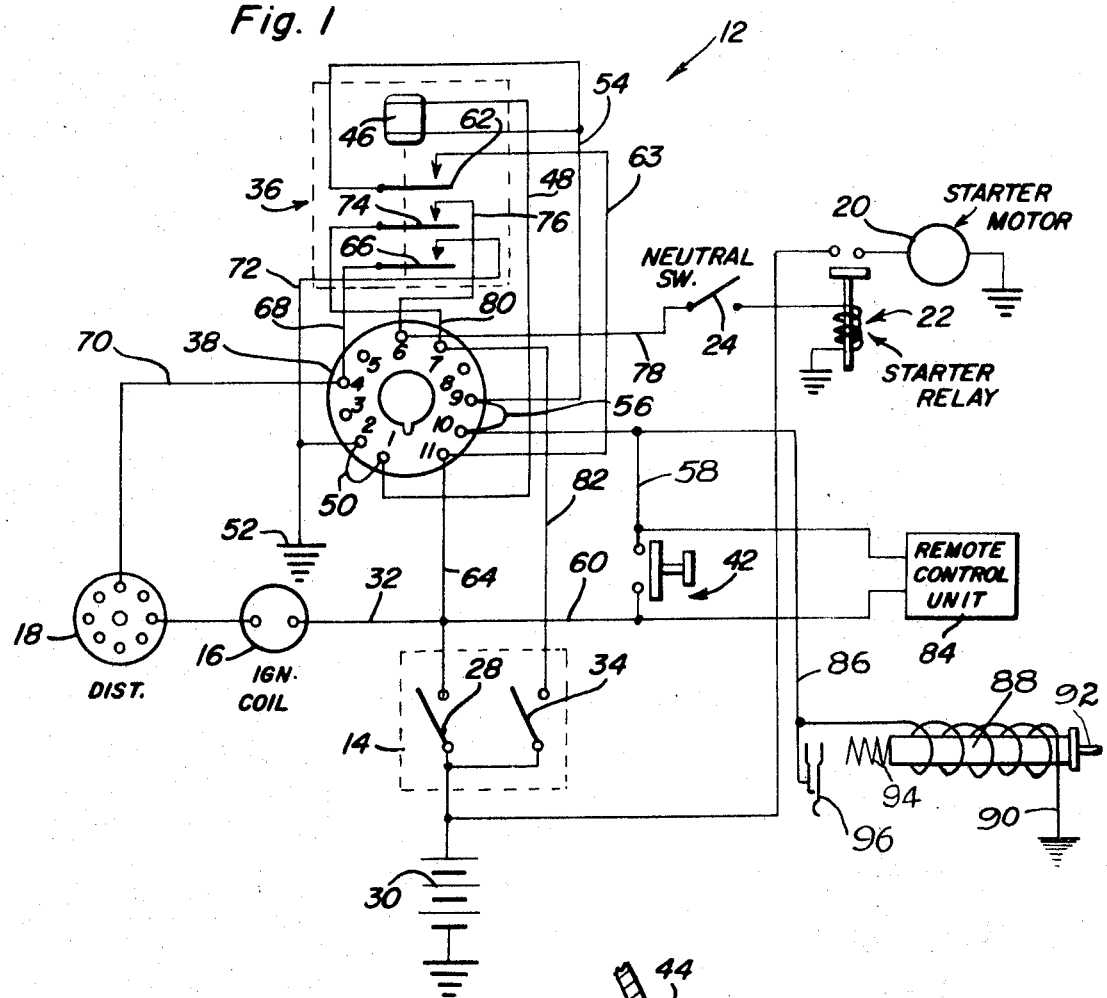
FIG. 1 is an electrical circuit diagram illustrating the protective ignition circuit of the present invention.
Figure 2:
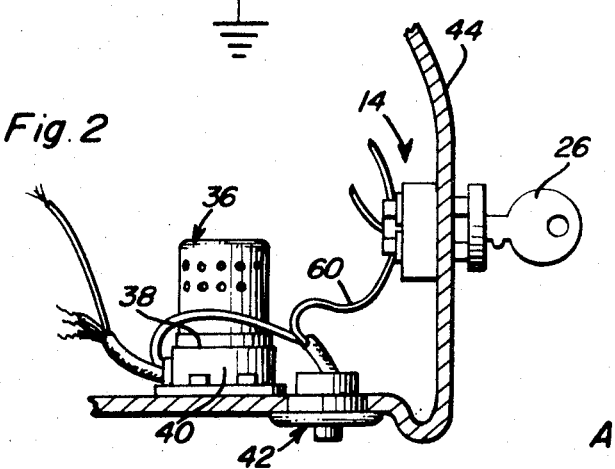
FIG. 2 is a partial sectional view through the control-portion of an automotive vehicle showing a typical installation of the components associated with the present invention.

Referring now to the drawing in detail, it will be observed from FIG. 1 that the protective circuit generally referred to by reference numeral 12 is associated with the usual components of a vehicle ignition starting circuit including the ignition switch assembly 14, the ignition coil 16, the distributor device 18, the engine starting motor 20, the starter relay 22 and the neutral switch 24. Ordinarily, the ignition switch assembly is actuated by means of an ignition key 26 as shown in FIG. 2 so that when the key is turned to the ignition position, the ignition switch element 28, as diagrammatically shown in FIG. 1 is closed to connect the vehicle battery 30 to the ignition system through conductor 32. When the ignition key is subsequently turned to the start position, the start switch 34 is closed so as to complete an energizing circuit through the relay coil of the starter relay 22 to complete an energizing circuit from the vehicle battery 30 through the starter motor 20. Also, starting is prevented unless the vehicle transmission is in a neutral condition at which time the neutral switch 24 is closed to permit completion of the energizing circuit through the starter relay.

In accordance with the present invention however, the energizing circiuts for the ignition system and the starter relay 22, are established through a relay component generally referred to by reference numeral 36. The relay component may be mounted and electrically connetced in circuit through a multiple-pin connector socket 38 mounted on an enclosure 40 within which the protective circuit is enclosed. Also wired between the protective circuit and the ignition switch, is the concealed push button reset switch 42. As shown in FIG. 2, the push button switch 42 is mounted at a hidden location as compared to the mounting of the ignition switch assembly 14 on the exposed dashboard panel 44.

The relay component 36 as shown in the illustrated embodiment of FIG. 1 includes a relay coil 46 having a ground terminal connected by the conductor 48 to the number 1 pin on the connector socket 38 which in turn is connected through the jumper 50 to the number 2 pin which is grounded at ground 52. The relay coil 46 is also provided with a power terminal connected through conductor 54 to the number 9 pin on the socket 38 which in turn is connected by the jumper 56 to the number 10 pin and through conductor 58 to one of the normally open contacts of the concealed reset push button switch 42. The other contact of the switch 42 is connected to the contact associated with the ignition switch element 28 by conductor 60. It will be apparent therefore, that when the ignition switch assembly is in the ignition position and the switch element 28 is closed, the relay coil 46 may be energized by closing of the switch 42.

A relay holding or disabling switch 62 is associated with the relay component. The relay switch 62 is normally open so that upon energization of the relay coil 46, it closes to connect the conductor 54 to the conductor 63 connected to the number 11 pin of the socket 38 to which the contact of ignition switch element 28 is connected through conductor 64. Accordingly, once the relay switch 62 is closed, a holding circuit is established for maintaining the relay coil 46 energized after the reset switch 42 is released as long as switch element 28 is closed.

As hereinbefore indicated, the energizing circuit for the ignition system is also completed through the relay component when the ignition switch element 28 is closed. Toward this end, the relay component includes a normally opened relay switch 66 connected by conductor 68 to the number 4 pin of the connector socket 38 to which the ground terminal of the distributor 18 is connected by conductor 70. The normally opened contact associated with the relay switch 66 is connected by conductor 72 to the grounded pin number 2 of the socket connector so that energization of the relay coil 46 closing the relay switch 66 applies ground to the distributor thereby completing an energizing circuit through the ignition coil 16. Should the conductor 70 be cut, ground would be removed and the ignition circuit deenergized so as to prevent any starting of the vehicle.

A third normally opened relay switch 74 is associated with the relay component and is connected by the conductor 76 to the number 6 pin of the socket connector which in turn is connected by conductor 78 to the neutral switch 24 in the energizing circuit for the starter relay 22. Accordingly, energization of the relay coil 46 closing the relay switch 74 connects the starter relay through the neutral switch 24 to pin number 7 of the socket connector through conductor 78, switch 74 and conductor 80, pin number 7 being connected through conductor 82 to the contact associated with the start switch element 34 in the ignition switch assembly. Thus, only if the relay component is energized, will closing of the start switch element 34 complete an energizing circuit for the starter relay in order to start the vehicle engine.

As hereinbefore indicated, starting of the vehicle engine can only be effected if the relay component 36 is energized. Energization of the relay component is however effected when the reset switch 42 is actuated after the ignition switch assembly is in the ignition position with the switch element 28 closed. Thus, starting of the vehicle engine would require a starting procedure and knowledge of the location of the concealed reset switch 42 known only to the vehicle driver. Unauthorized starting of the vehicle engine is thereby prevented. Further, the protective circuit will prevent unauthorized starting by bypass of the ignition switch or cutting of any of the wires and will avoid run down of the vehicle battery. If desired, an individualized remote control unit 84 as shown in FIG. 1 may operationally replace the reset switch 42. In such cast, the switch 42 would only be used for emergency purposes should the driver forget the remote control activator (not shown) associated with the unit 84. The switch 42 could then be hidden at an almost inaccessible location.

In addition to the ignition protection aspects of the present invention, means are also provided to prevent the theft of engine parts from beneath the hood or articles kept in the trunk. Frequently, vandals will strip an engine rather than take the entire car, or they will steal the spare tire or other valuables kept in the trunk. A locking device which would prevent the opening of the hood unless the location of the hidden switch were known, not only would prevent such thefts but would also prevent a vandal from gaining entry to the engine compartment to attempt the disabling of the ignition protection system.

A solenoid 88 has one terminal connected through line 86 to terminal or pin number 10 of the socket connector. The other terminal of the solenoid is grounded at 90. Although only one solenoid is shown in FIG. 1, it will be understood that additional solenoids can be provided in the same manner to lock the trunk lid closed, or for other desired purposes. The solenoid 88 may be positioned beneath the vehicle hood so that the plunger rod 92, normally extended by the spring 94, projects through an aperture in the hood to keep it closed. The solenoid is electrically actuated simultaneously with the energization of the rest of the ignition protection system, by first turning the ignition key and then momentarily depressing the button 42.

Because the solenoid 88 is actuated by the vehicle battery 30, one may experience difficulty in opening the car hood should the battery 30 go dead, and since the battery is normally kept beneath the hood, there would be no remedy for this situation. Accordingly, the invention includes an external jack 96 connected to line 86 whereby an auxiliary or emergency battery may be connected to actuate the locking means to open the hood or to start the car. The external jack 96 may be located inside the car in a hidden location if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. In combination with an ignition-controlled engine for a vehicle having a source of electrical energy, an ignition switch assembly connected in series with an ignition coil and a distributor device to the source, and an engine starting device adapted to start the engine when energized from the source simultaneously with the ignition coil, a protective circuit comprising a reset switch connected to the source through the ignition switch assembly, means mounting the reset switch within said vehicle at any selected location; relay means connected to the distributor device, the ignition switch assembly and the starting device to establish energizing circuits for the ignition coil and the starting device through the ignition switch assembly, means connecting the reset switch to the relay means for energization thereof establishing said energizing circuits in response to actuation of the reset switch, said relay means including disabling switch means interrupting said energizing circuits in response to deenergization of the ignition coil, remote control means connected in parallel with said reset switch for actuating said relay means from a remote position; and locking means electrically coupled to said reset means and to said ignition switch assembly, said locking means adapted to be mounted beneath the hood of the vehicle operative to lock the hood in a closed position, said locking means being actuated when said ignition switch is in position to complete energizing circuits through the ignition coil and when said reset switch is momentarily actuated to energize said relay means.

2. The combination of claim 1 wherein said locking means further includes external circuit connection means, said external connection means adapted to be mounted on the vehicle at a hidden location, said connection means affording means for connecting an auxiliary battery into the protective circuit for disengaging said locking means in the event of failure of the vehicle's own battery.

3. The combination of claim 1 wherein said locking means comprises a plurality of solenoids whereby one of the solenoids may be mounted to lock the hood of a vehicle closed and another of the solenoids may be mounted to lock the trunk lid.

References Cited

UNITED STATES PATENTS 1,974,944    9/1934    Black _____ 180—114 X
3,194,970    7/1965    Claps.

A. HARRY LEVY, Primary Examiner

U.S. Cl. X.R.

307—10